US010193753B1

United States Patent
Tabet et al.

(10) Patent No.: US 10,193,753 B1
(45) Date of Patent: Jan. 29, 2019

(54) AUTOMATED CONFIGURATION AND DEPLOYMENT OF INTERNET OF THINGS PLATFORMS

(71) Applicant: EMC IP Holding Company LLC, Hopkinton, MA (US)

(72) Inventors: Said Tabet, Natick, MA (US); Kelly Kanellakis, Toronto (CA); Calvin Donahue Smith, Framingham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 273 days.

(21) Appl. No.: 15/223,619

(22) Filed: Jul. 29, 2016

Related U.S. Application Data

(60) Provisional application No. 62/212,029, filed on Aug. 31, 2015, provisional application No. 62/212,034, filed on Aug. 31, 2015.

(51) Int. Cl.
   *H04L 12/24* (2006.01)
   *H04L 29/08* (2006.01)
(52) U.S. Cl.
   CPC ...... *H04L 41/0843* (2013.01); *H04L 41/0813* (2013.01); *H04L 67/10* (2013.01)
(58) Field of Classification Search
   None
   See application file for complete search history.

(56) References Cited

U.S. PATENT DOCUMENTS

| 9,020,802 B1 | 4/2015 | Florissi et al. |
| 9,031,992 B1 | 5/2015 | Florissi et al. |
| 9,158,843 B1 | 10/2015 | Florissi et al. |

(Continued)

OTHER PUBLICATIONS

International Telecommunications Union, "Series Y: Global Information Infrastructure, Internet Protocol Aspects and Next-Generation Networks—Next Generation Networks—Frameworks and Functional Architecture Models—Overview of the Internet of Things," Recommendation ITU-T Y.2060, Jun. 2012, 22 pages.

(Continued)

*Primary Examiner* — Joshua Joo
(74) *Attorney, Agent, or Firm* — Ryan, Mason & Lewis, LLP

(57) ABSTRACT

An apparatus comprises an Internet of Things (IoT) platform configuration and deployment system accessible to a plurality of user devices over at least one network. The IoT platform configuration and deployment system comprises a configuration and deployment controller, and a multi-tiered adaptive service catalog associated with the controller. The configuration and deployment controller is configured to receive requirements input for respective ones of a plurality of requested IoT platforms from one or more of the user devices and to determine corresponding sets of resources for implementation of the respective IoT platforms based at least in part on one or more services selected from the multi-tiered adaptive service catalog. The IoT platforms are deployed utilizing the respective sets of resources determined by the configuration and deployment controller. Each of the deployed IoT platforms is illustratively configured to interact with a different set of IoT devices.

20 Claims, 8 Drawing Sheets

(56) References Cited

U.S. PATENT DOCUMENTS

| | | | |
|---|---|---|---|
| 2016/0007141 A1* | 1/2016 | Anantharangachar | ........................ H04W 4/008 709/219 |
| 2016/0044136 A1* | 2/2016 | Schiff | ..................... H04L 67/10 709/221 |
| 2016/0285703 A1* | 9/2016 | Joe | ....................... H04L 41/5051 |
| 2016/0323156 A1* | 11/2016 | Zakaria | ................... H04L 43/04 |
| 2017/0126787 A1* | 5/2017 | Martinez | ................. H04L 67/10 |
| 2017/0134246 A1* | 5/2017 | Amendjian | .......... H04L 41/5058 |
| 2017/0207985 A1* | 7/2017 | Jayanti Venkata | ........................... H04L 41/5096 |

OTHER PUBLICATIONS

V.K. Vavilapalli et al., "Apache Hadoop YARN: Yet Another Resource Negotiator," Proceedings of the 4th Annual Symposium on Cloud Computing (SOCC), Oct. 2013, 16 pages, Article No. 5.

* cited by examiner

AUTOMATED CONFIGURATION AND DEPLOYMENT OF INTERNET OF THINGS PLATFORMS

PRIORITY CLAIM

The present application claims priority to U.S. Provisional Patent Application Ser. No. 62/212,029, filed Aug. 31, 2015 and entitled "Method and System for Internet of Things Platform Design, Development and Deployment," and U.S. Provisional Patent Application Ser. No. 62/212,034, filed Aug. 31, 2015 and entitled "Multi-Tier Adaptive Internet of Things Catalogue," both of which are incorporated by reference herein in their entirety.

FIELD

The field relates generally to information processing systems, and more particularly to information processing systems that process information from devices associated with the Internet of Things (IoT).

BACKGROUND

Information processing systems can be configured to process data from distributed sensors, smart objects, smart appliances, smart automobiles or other types and arrangements of interconnected IoT devices. However, as the number of IoT devices continues to increase, the implementation of IoT-based systems under conventional practice presents a number of significant problems. For example, these systems can be very difficult to scale to increasingly larger number of IoT devices of different types due to the high level of complexity of individual customer use cases. In addition, there are wide variations between different IoT environments across verticals. As a result, IoT-based systems are often deployed as single-vendor solutions that are configured for a particular customer use case within a given vertical, and not readily adaptable to other use cases or verticals. Such arrangements tend to increase the costs of deploying IoT-based systems while also limiting their performance.

SUMMARY

Illustrative embodiments of the present invention provide automated configuration and deployment of IoT platforms in a manner that overcomes the above-described drawbacks of conventional arrangements. For example, IoT platform configuration and deployment arrangements in some embodiments implement highly desirable features such as rapid IoT platform creation potentially integrating a diverse array of applications and other resources from a broad range of distinct partners. IoT platforms for different use cases and verticals can be deployed in an efficient and scalable manner that meets customer needs while also reducing costs and improving performance.

In one embodiment, an apparatus comprises an IoT platform configuration and deployment system accessible to a plurality of user devices over at least one network. The IoT platform configuration and deployment system comprises a configuration and deployment controller, and a multi-tiered adaptive service catalog associated with the controller. The configuration and deployment controller is configured to receive requirements input for respective ones of a plurality of requested IoT platforms from one or more of the user devices and to determine corresponding sets of resources for implementation of the respective IoT platforms based at least in part on one or more services selected from the multi-tiered adaptive service catalog. The IoT platforms are deployed utilizing the respective sets of resources determined by the configuration and deployment controller. Each of the deployed IoT platforms is illustratively configured to interact with a different set of IoT devices.

The set of resources determined by the configuration and deployment controller for a given one of the IoT platforms in some embodiments comprises remote edge site resources, communications transport resources and data center resources.

The multi-tiered adaptive service catalog in some embodiments comprises an IoT blueprint library. In such an arrangement, at least a subset of the IoT platforms are implemented in accordance with respective distinct instances of the IoT blueprint library.

As another example, the multi-tiered adaptive service catalog may more particularly include a lower tier comprising one or more service deployment frameworks, an intermediate tier comprising vertically-defined base applications, and an upper tier comprising ecosystem applications. The ecosystem applications may include applications designed internally to a given vendor organization, applications designed externally to the given vendor organization, and applications designed in partnership between the given vendor organization and one or more third-party partners.

The configuration and deployment controller may further comprise an IoT management module that spans the sets of resources utilized to implement respective ones of the IoT platforms. The IoT management module illustratively supports interaction with multiple external system provider or system integrator partners each associated with one or more portions of the sets of resources.

The configuration and deployment controller may implement an applications marketplace comprising vendor-defined applications, system integrator applications and third-party applications utilizable within a given one of the sets of resources for implementing a corresponding one of the IoT platforms.

As indicated above, one or more of the illustrative embodiments provide significant advantages relative to conventional arrangements. For example, a given such embodiment allows IoT platforms to be configured and deployed in a particularly efficient manner that is readily scalable to increasingly larger numbers of IoT devices. A wide variety of different customer needs can be met through corresponding distinct deployed IoT platforms that each incorporate potentially different applications and other resources from different vendors, partners, system providers and system integrators. Moreover, combinations of legacy or "brownfield" IoT devices with new or "greenfield" IoT devices can be easily accommodated by a given one of the deployed IoT platforms.

These and other illustrative embodiments include, without limitation, methods, apparatus, systems, and computer program products comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, a plurality of data centers each comprising one or more clouds hosting multiple tenants that share cloud resources.

Figure 1:
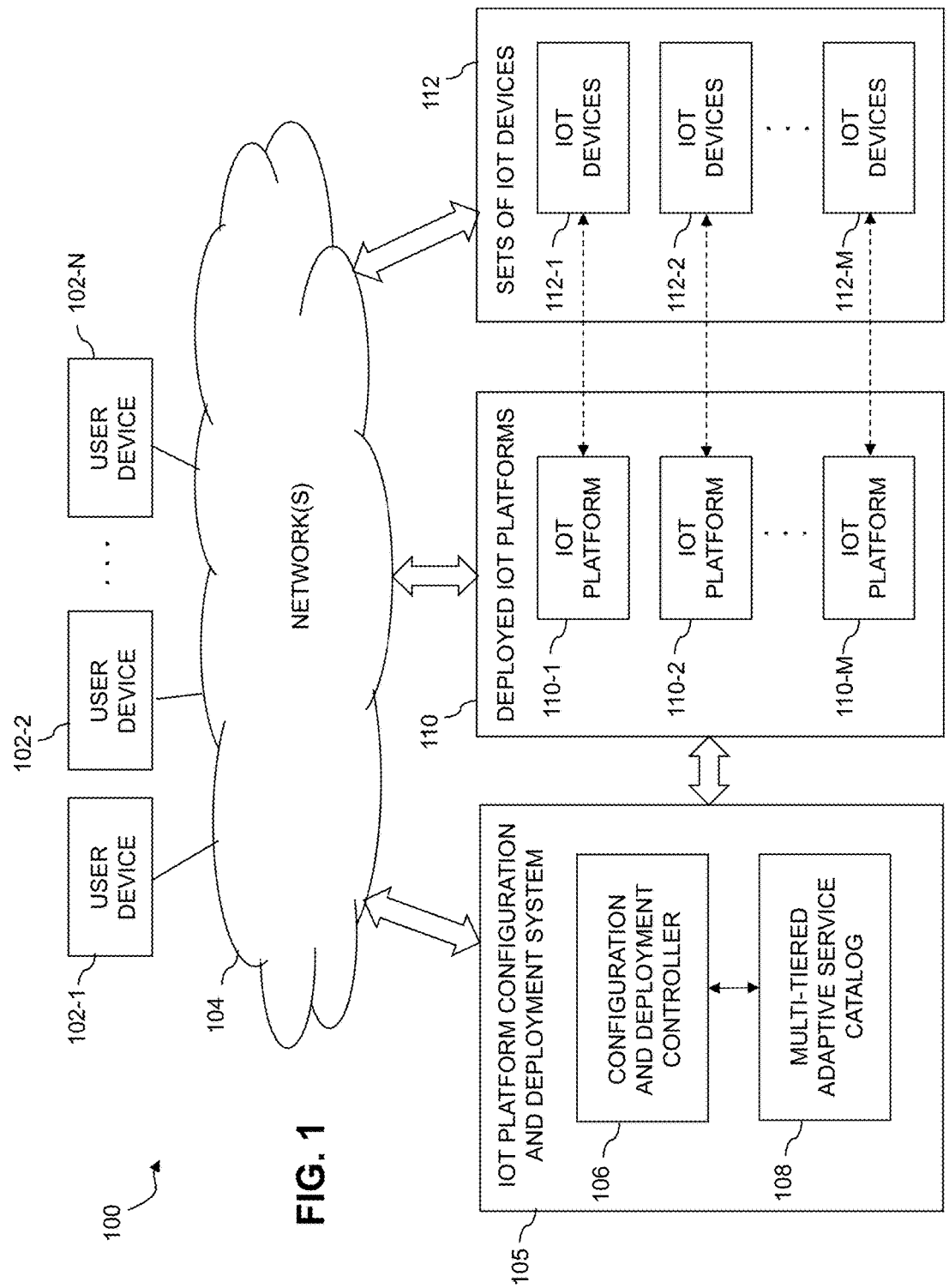
FIG. 1 shows an information processing system having functionality for automated configuration and deployment of IoT platforms in an illustrative embodiment.

FIG. 1 shows an information processing system 100 configured in accordance with an illustrative embodiment of the present invention. The information processing system 100 is assumed to be built on at least one processing platform and provides functionality for automated configuration and deployment of IoT platforms. In this embodiment, the system 100 more particularly comprises a plurality of user devices 102-1, 102-2, . . . 102-N coupled to a network 104. Also coupled to the network 104 is an IoT platform configuration and deployment system 105 comprising a configuration and deployment controller 106 having an associated multi-tiered adaptive service catalog 108. The IoT platform configuration and deployment system 105 is accessible to the user devices 102 over the network 104.

The user devices 102 can comprise, for example, desktop, laptop or tablet computers, mobile telephones, or other types of processing devices capable of communicating with the IoT platform configuration and deployment system 105 over the network 104.

The "users" in a given embodiment may refer, for example, to respective ones of the user devices 102, although the term "user" as utilized herein is intended to be broadly construed so as to encompass numerous other arrangements of human, hardware, software or firmware entities, as well as combinations of such entities. Accordingly, a user may be a human user, or a software entity such as an application, or any of a wide variety of other entity arrangements.

The network 104 may comprise any type of network, including by way of example a global computer network such as the Internet, a wide area network (WAN), a local area network (LAN), a satellite network, a telephone or cable network, a cellular network, a wireless network such as a WiFi or WiMAX network, or various portions or combinations of these and other types of networks.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The configuration and deployment controller 106 is configured to receive requirements input for respective ones of a plurality of requested IoT platforms from one or more of the user devices 102. Such requirements input may be in any of a wide variety of different formats and in some embodiments reflects particular customer needs associated with deployment of a requested IoT platform in a given use case or vertical. However, the term "requirements input" as used herein is intended to be broadly construed so as to encompass, for example, indications received from a given one or the user devices 102 responsive to lists of available features presented to a user in one or more user interface screens.

The configuration and deployment controller 106 is further configured to determine corresponding sets of resources for implementation of the respective IoT platforms based at least in part on one or more services selected from the multi-tiered adaptive service catalog 108. The resulting deployed IoT platforms 110 include individual IoT platforms 110-1, 110-2, . . . 110-M, and are deployed utilizing the respective sets of resources determined by the configuration and deployment controller 106. The deployed IoT platforms 110 are configured to interact with respective different sets of IoT devices 112 that include individual sets of IoT devices 112-1, 112-2, . . . 112-M.

In other embodiments, multiple ones of the deployed IoT platforms 110 can interact with the same set of IoT devices 112. Moreover, the various sets of IoT devices 112 are not necessarily disjoint sets. Accordingly, two or more of the sets may each include one or more of the same IoT devices.

The deployed IoT platforms 110 and their respective associated sets of IoT devices 112 are also shown as being coupled to the network 104. The deployed IoT platforms 110 can additionally or alternatively communicate directly with the IoT platform configuration and deployment system 105 as illustrated. Similarly, each of the deployed IoT platforms 110 can additionally or alternatively communicate directly with its corresponding set of IoT devices 112 rather than relying on the network 104 for such communications.

The set of resources determined by the configuration and deployment controller 106 for a given one of the IoT platforms 110 comprises remote edge site resources, communications transport resources and data center resources.

The remote edge site resources illustratively comprise at least one software-defined gateway and at least one software-defined customer premises equipment (CPE) element.

The communications transport resources illustratively comprise a combination of wireless resources and wireline resources, and may more particularly comprise at least one transport cloud and at least one public, private or hybrid cloud.

The data center resources illustratively comprise processor, network and storage resources. As a more particular example, the data center resources may further comprise a plurality of applications at least a subset of which are associated with at least one service of the multi-tiered adaptive service catalog 108.

Additional examples of these and other sets of resources that may be utilized in deployment of a given one of the IoT platforms 110 will be described in more detail below in conjunction with the illustrative embodiments of FIGS. 3 through 6.

The configuration and deployment controller 106 in some embodiments further comprises an IoT management module that spans the sets of resources utilized to implement respective ones of the IoT platforms 110. Such an IoT management module can be configured to support interaction with multiple external system provider or system integrator partners each associated with one or more portions of the sets of resources.

The multi-tiered adaptive service catalog 108 in some embodiments comprises at least one IoT blueprint library. In such embodiments, respective ones of the IoT platforms 110 may be implemented under the control of the configuration and deployment controller 106 in accordance with respective distinct instances of the IoT blueprint library provided by the multi-tiered adaptive service catalog 108.

The multi-tiered adaptive service catalog 108 in the present embodiment is assumed to comprise at least a lower tier comprising one or more service deployment frameworks, an intermediate tier comprising vertically-defined base applications, and an upper tier comprising ecosystem applications. However, other types and arrangements of multiple tiers characterizing various distinct aspects of potential IoT platform deployment arrangements can be used in other embodiments. Accordingly, the term "multi-tiered adaptive service catalog" as used herein is intended to be broadly construed.

The ecosystem applications associated with the upper tier of the multi-tiered adaptive service catalog 108 illustratively comprise multiple distinct types of applications, including applications designed internally to a given vendor organization, applications designed externally to the given vendor organization, and applications designed in partnership between the given vendor organization and one or more third-party partners. Other types of applications can be used in other embodiments.

Additionally or alternatively, the configuration and deployment controller 106 can implement an applications marketplace comprising vendor-defined applications, system integrator applications and third-party applications utilizable within a given one of the sets of resources for implementing a corresponding one of the IoT platforms 110.

The multi-tiered adaptive service catalog 108 in some embodiments provides a hierarchical arrangement relating components from primary vendors, secondary vendors and their associated system integrators and system providers in order to accommodate a diverse array of possible customer use cases. For example, a primary vendor can create multiple congruent marketplaces based on verticals and other customer-segmented defined secondary vendors, system integrators and system providers. Similarly, each of the secondary vendors, system integrators and system providers can each define marketplaces contained within their vertical for underlying entities such as potential re-sellers or customers. These entities can consume vertically-specific applications provided through this chain directly from the contained marketplaces. This hierarchical arrangement allows specific traits and capabilities to be passed from level to level and facilitates development of new components to meet dynamically-varying customer requirements for IoT solutions.

In some embodiments, the configuration and deployment controller 106 includes one or more suitability engines configured to match customer requirements to components of the multi-tiered adaptive service catalog 108. Particular instances of such a suitability engine can be defined at least in part by a corresponding infrastructure provider and managed by an associated system integrator. For example, the system integrator may work with a particular customer to define the requirements as input to a given instance of the suitability engine. The suitability engine may process the input and select the appropriate product, service, and solution mix from the infrastructure provider.

The individual IoT devices that comprise one or more of the sets of IoT devices 112 are in some embodiments distributed over a wide geographic area, and are configured to communicate over one or more networks with their corresponding deployed IoT platforms 110. These IoT devices illustratively comprise, for example, distributed sensors, smart objects, smart appliances, smart automobiles or other types and arrangements of interconnected IoT devices. For example, one type of IoT device comprises a sensor that incorporates functionality to monitor and measure a set of properties associated with its surroundings, and communication functionality to make these measurements available to other system entities. It is also possible for some of the IoT devices to comprise more sophisticated devices such as mobile telephones, laptop computers, tablet computers or other types of processing devices. Additional illustrative examples of these and other types of IoT devices are disclosed in ITU-T Recommendation Y.2060, June 2012, which is incorporated by reference herein. Accordingly, the term "IoT device" as used herein is intended to be broadly construed.

A given one of the IoT platforms 110 may itself also be distributed. For example, a given IoT platform in some embodiments is implemented using a plurality of distributed processing nodes, illustratively comprising cloud compute nodes and cloud storage nodes of cloud infrastructure, although numerous other arrangements are possible.

As a more particular example, a distributed implementation of a given one of the IoT platforms 110 in one embodiment is configured to perform analytics operations in accordance with a processing framework supported by an Apache Hadoop YARN ("Yet Another Resource Negotiator") cluster. Examples of frameworks supported by the Hadoop YARN platform include MapReduce, Spark, Hive, MPI and numerous others. Apache Hadoop YARN is also referred to as Hadoop 2.0, and is described in, for example, V. K. Vavilapalli et al., "Apache Hadoop YARN: Yet Another Resource Negotiator," Proceedings of the 4th Annual Symposium on Cloud Computing, SOCC '13, pp. 5:1-5:16, ACM, New York, N.Y., USA, 2013, which is incorporated by reference herein.

In some embodiments, a plurality of processing nodes collectively implement at least a portion of a distributed IoT platform that is more particularly in the form of a multi-cluster distributed data processing platform. Such a platform may comprise, for example, a plurality of potentially geographically-distributed YARN clusters each comprising a corresponding cluster of distributed processing nodes.

A wide variety of other types of processing nodes can be used in other embodiments. For example, additional or alternative types of processing node functionality that may be incorporated in at least a subset of the processing nodes of an information processing system in illustrative embodiments are described in U.S. Pat. No. 9,020,802, entitled "Worldwide Distributed Architecture Model and Management," and U.S. Pat. No. 9,158,843, entitled "Addressing Mechanism for Data at World Wide Scale," which are commonly assigned herewith and incorporated by reference herein.

It is to be appreciated that the particular arrangement of system elements shown in FIG. 1 is for purposes of illustration only, and that other arrangements of additional or alternative elements can be used in other embodiments. For example, numerous alternative information processing system configurations can be used to implement IoT platform configuration and deployment functionality as disclosed herein.

The operation of the system 100 will now be described in further detail with reference to the flow diagram of FIG. 2. The process as shown includes steps 200, 202 and 204, and is suitable for use in the system 100 but is more generally applicable to other types of information processing systems.

In step 200, requirements input for respective ones of a plurality of requested IoT platforms is received from one or more user devices over at least one network. With reference to the FIG. 1 embodiment, requirements input can be received in the IoT platform configuration and deployment system 105 from user devices 102. For example, a given user associated with one of the user devices 102 can provide such input to the system 105 in order to deploy one or more of the IoT platforms 110.

In step 202, corresponding sets of resources are determined for implementation of the respective IoT platforms based at least in part on one or more services selected from a multi-tiered adaptive service catalog.

As previously mentioned, the set of resources determined for a given one of the IoT platforms may comprise remote edge site resources, communications transport resources and data center resources.

Also, the multi-tiered adaptive service catalog in some embodiments comprises an IoT blueprint library, and at least a subset of the IoT platforms are implemented in accordance with respective distinct instances of the IoT blueprint library.

In step 204, deployment of the IoT platforms is controlled utilizing the respective sets of resources. Each of the deployed IoT platforms may be configured to interact with a different set of IoT devices. Alternatively, there may be some overlap between the different sets of IoT devices associated with the deployed platforms.

In some embodiments, a given one of the deployed IoT platforms is configured to perform Big Data analytics on IoT data supplied by its corresponding set of IoT devices. Additional details regarding Big Data analytics that can be implemented in illustrative embodiments of the present invention are described in U.S. Pat. No. 9,031,992, entitled "Analyzing Big Data," which is commonly assigned herewith and incorporated by reference herein.

Such a deployed IoT platform is illustratively configured to leverage one or more frameworks supported by Hadoop YARN, such as MapReduce, Spark, Hive, MPI and numerous others, to support distributed computations relating to the IoT devices.

Figure 2:
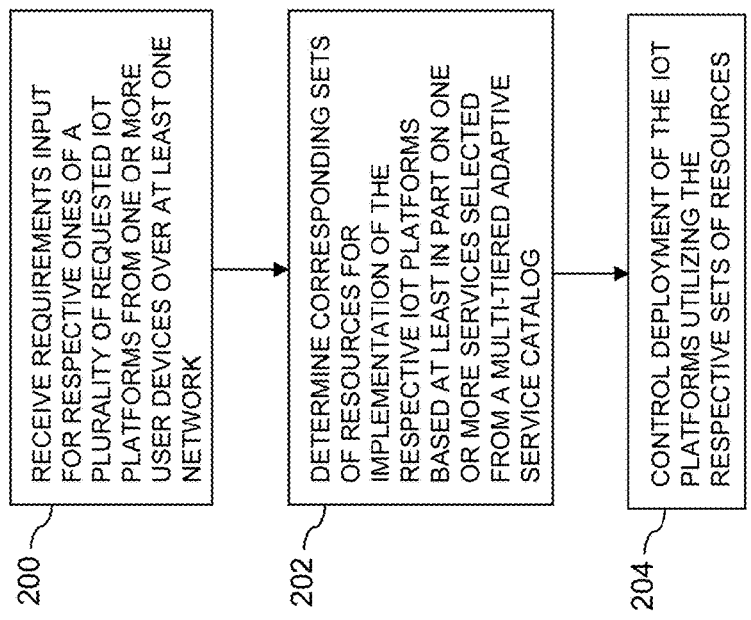
FIG. 2 is a flow diagram of an example process for automated configuration and deployment of IoT platforms in the information processing system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementing IoT platform configuration and deployment functionality. For example, the ordering of the process steps may be varied in other embodiments, or certain steps may be performed concurrently with one another rather than serially. Also, one or more of the process steps may be repeated periodically for reconfiguring or otherwise adjusting one or more deployed IoT platforms, or multiple instances of the process can be performed in parallel with one another for configuration and deployment of additional IoT platforms.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments will now be described with reference to FIGS. 3 through 6. These figures show different views of an information processing system 300 comprising an automatically configured and deployed IoT platform 310-1 in an illustrative embodiment. The deployed IoT platform 310-1 may be viewed as corresponding to a particular one of the deployed IoT platforms 110 of the FIG. 1 embodiment.

Figure 3:
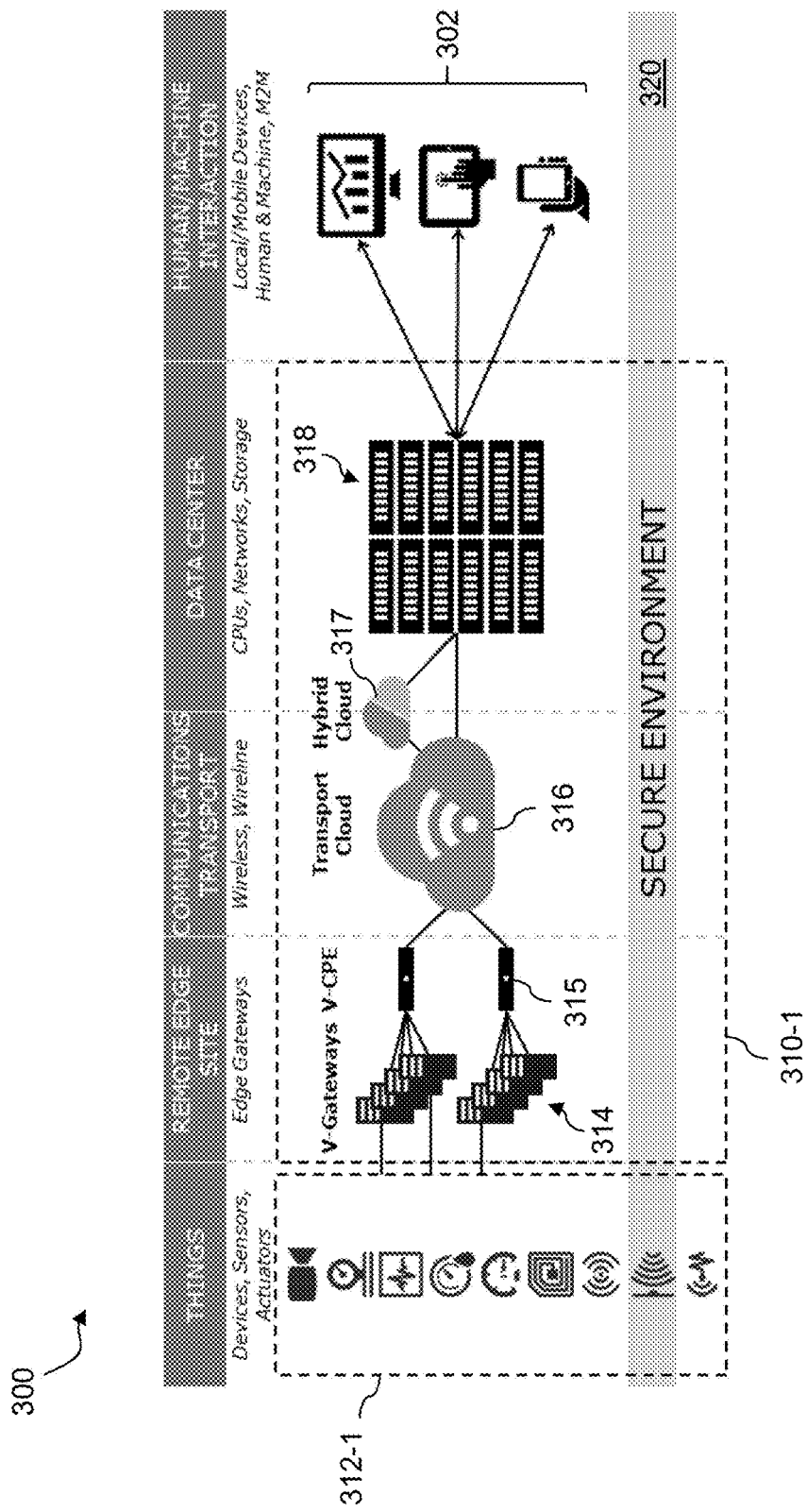
FIGS. 3 through 6 show different views of an information processing system comprising automatically configured and deployed IoT platforms in illustrative embodiments.

Referring initially to FIG. 3, the information processing system 300 comprises a set of IoT devices 312-1 illustratively comprising sensors, actuators and other IoT devices. The system 300 is arranged in the form of multiple layers providing an end-to-end ecosystem for IoT that can leverage existing and new technologies. Such an arrangement provides particularly efficient configuration and deployment of IoT platforms in a manner that overcomes the significant drawbacks of conventional practice. As will be described, it illustratively provides a blueprint-based approach for a scalable and repeatable process of IoT platform configuration and deployment.

The multiple layers of the system architecture illustrated in FIG. 3 include a "things" layer at the far left which comprises the set of IoT devices 312-1. This is followed in order from left to right by a remote edge site layer, a communications transport layer, a data center layer, and finally a human/machine interaction layer at the far right.

The deployed IoT platform 310-1 illustratively comprises a set of resources comprising components of the remote edge site layer, the communications transport layer and the data center layer.

Resources of the remote edge site layer illustratively comprise a plurality of edge gateways, implemented in the form of software-defined gateways 314, each of which is coupled to one of a plurality of software-defined CPE elements 315. The software-defined gateways 314 in this embodiment are also referred to as virtual gateways ("vGateways"). Similarly, the software-defined CPE elements 315 in this embodiment are also referred to as virtual CPE elements ("vCPEs"). The software-defined gateways 314 each aggregate IoT data from multiple ones of the IoT devices in the set of IoT devices 312-1. Additionally or alternatively, a given software-defined gateway 314 can manage multiple physical gateways. The software-defined CPE elements provide an additional layer of aggregation for IoT data supplied from multiple ones of the software-defined gateways 314.

The software-defined gateways 314 and the software-defined CPE elements 315 are each assumed to comprise CPU, memory, storage and communications resources. For example, these components can be implemented using virtual machines, hypervisors, containers and other virtual infrastructure. The use of software-defined gateways 314 and software-defined CPE elements 315 allows a wide variety of different deployment scenarios to be supported in a seamless and transparent manner.

Resources of the communications transport layer illustratively comprise both wireless resources and wireline resources. These more particularly comprise connections through a public or private transport cloud 316. Additional connections associated with at least a portion of a hybrid cloud 317 are also considered part of this layer. Other embodiments can be configured to include one or more public clouds and/or one or more private clouds in addition to or in place of the hybrid cloud 317.

Resources of the data center layer illustratively comprise processor, network and storage resources of one or more data centers. Such resources are illustrated as part of a processing platform 318 that includes a plurality of processing devices. The processor resources in this embodiment more particularly comprise central processing unit (CPU) resources, although other types of processor resources can be used in other embodiments. Additional or alternative resources that can be considered part of this layer include various applications that execute utilizing the processor, network and storage resources. Such applications may be associated with at least one service of a multi-tiered adaptive service catalog.

The above-described remote edge site resources, communications transport resources and data center resources represent one example of a set of resources that can be automatically determined by a configuration and deployment controller for use in implementation of the deployed IoT platform 310-1.

The deployed IoT platform 310-1 interacts with user devices 302 of the human/machine interaction layer over one or more networks. The user devices 302 illustratively include a desktop computer, a tablet computer and a mobile telephone, but may include additional local or mobile devices supporting human and machine interaction. Additional or alternative devices of the human/machine interaction layer may include devices supporting machine-to-machine (M2M) communication.

The system 300 further implements a secure environment 320 across all of the multiple layers of the architecture. The secure environment 320 is illustratively configured to perform operations such as identification, authorization and access management throughout the layers of the architecture.

Figure 4:
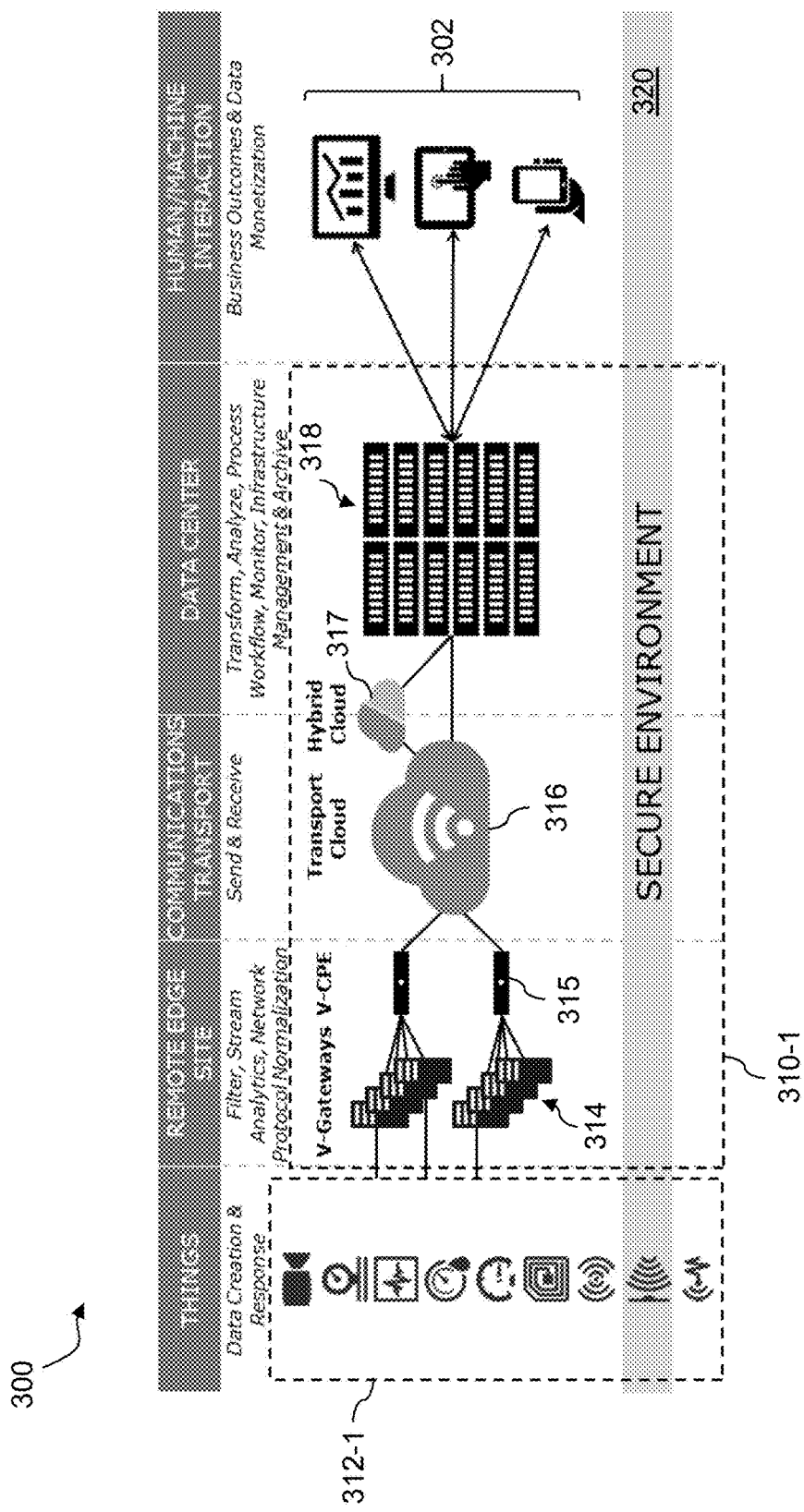

FIG. 4 shows another view of the information processing system 300 illustrating examples of particular types of functionality associated with the various layers of the system architecture.

In the far left layer, the IoT devices 312-1 monitor their respective environments to produce IoT data. Some of the IoT devices are equipped with functionality to not only produce IoT data but also to react and respond to their respective environments. These are examples of data creation and response functionality.

The remote edge site layer includes the vGateways 314 that serve as the first level of aggregation from the IoT devices 312-1. This is where the IoT data is aggregated for delivery to the vCPEs 315. The vGateways 314 are software-defined gateways in the present embodiment in order to provide dynamically reconfigurable functionality such as initial filtering, stream analytics and network protocol normalization for potentially massive amounts of IoT data in multiple distinct data formats received over various types of networks. The vGateways 314 also provide store-and-forward functionality for providing normalized and contextually-relevant IoT data to the appropriate ones of the vCPEs 315. The vCPEs 315 collectively implement a second level of aggregation that leverages greater processing and storage capabilities to perform additional filtering, deeper analytics and more sophisticated store-and-forward functions. For example, the vCPEs 315 may be implemented using a converged infrastructure device comprising all-flash storage and a CPU blade array. Such an arrangement allows certain applications associated with the IoT platform 310-1 to be deployed at least in part within the remote edge site layer of the system architecture.

The communications transport layer provides send and receive functionality including connections between the remote edge sites and the data centers. Such connections are implemented at least in part utilizing transport cloud 316 and hybrid cloud 317.

The data center layer may comprise a single data center or multiple potentially geographically-dispersed data centers. Each such data center is configured to provide functions including transformation of IoT data, deep analytics of the transformed data, and configuration and management of business process workflows utilizing the analyzed and transformed data. Additional functionality provided by the data center layer illustratively includes monitoring of operational and information management functions as well as infrastructure management and archiving. The latter function can involve use of tiered storage, possibly in the form of a data lake. Most applications associated with the IoT platform 310-1 are implemented in the data center layer. Such applications and the related functions identified above are implemented using processing platform 318.

The human/machine interaction layer comprising user devices 302 is illustratively configured to support business outcomes and data monetization. For example, business outcomes and data monetization can be realized in the form of cost efficiencies, revenue recognition and creation of new business models.

Figure 5:
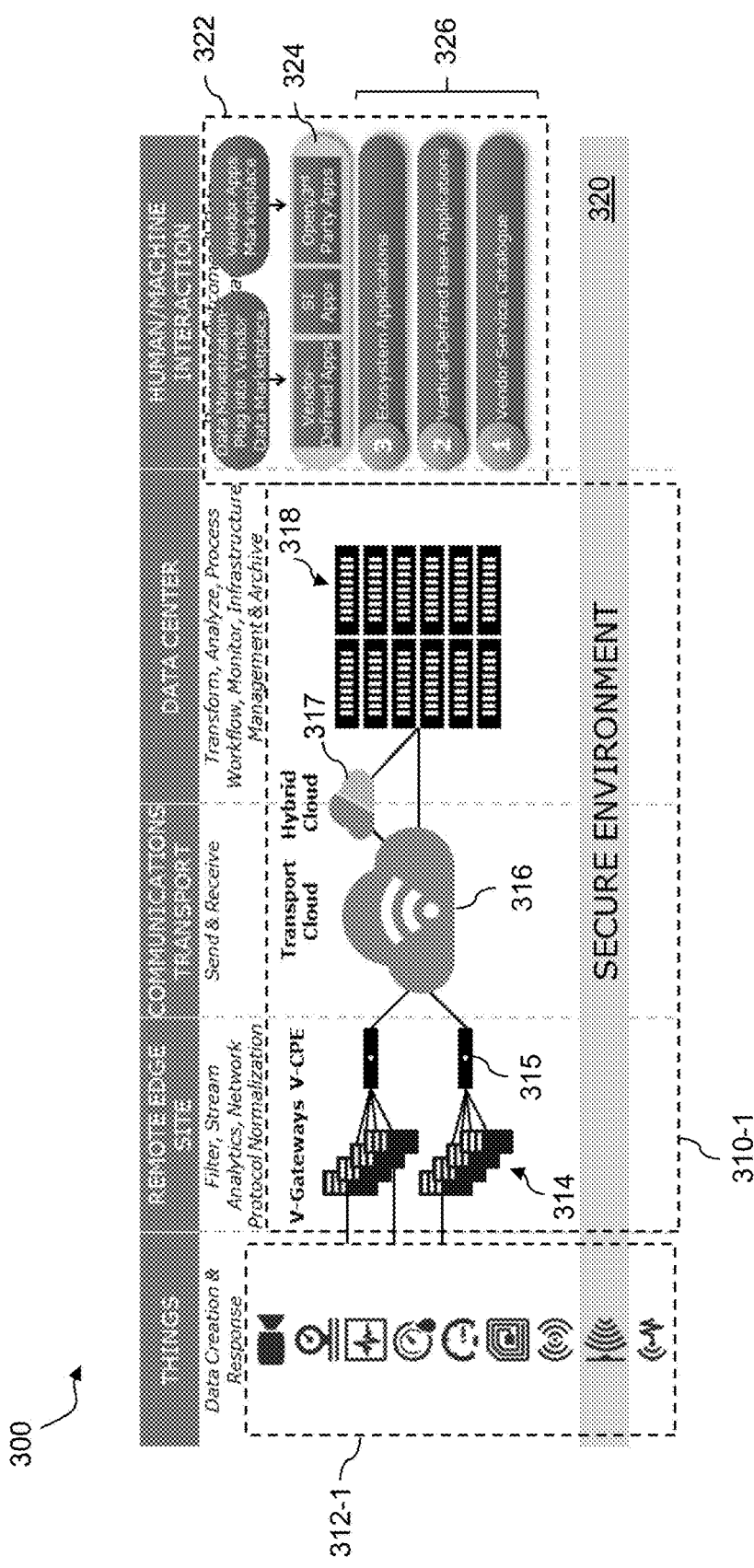

Referring now to FIG. 5, another view of the system 300 illustrates a set of applications 322 that are accessible via the human/machine interaction layer of the system architecture. Although the applications 322 are shown as being accessible via the human/machine interaction layer, at least a subset of these applications execute at least in part on the processing platform 318 of the data center layer, and possibly on other processing devices elsewhere in the system 300. The set of applications 322 are illustratively associated with an IoT blueprint library of a multi-tiered adaptive service catalog. The IoT platform 310-1 and possibly other IoT platforms of the system 300 may be implemented in accordance with respective distinct instances of the IoT blueprint library. The user devices 302 are not explicitly shown in this figure but are assumed to be present within system 300 as part of the human/machine interaction layer of the system architecture as illustrated in FIGS. 3 and 4.

The set of applications 322 more particularly comprises a federation applications marketplace 324 comprising vendor-defined applications, system integrator (SI) applications and open and/or third-party applications utilizable within the set of resources used to implement the IoT platform 310-1.

The federation applications marketplace 324 in this embodiment is utilized by data monetization plug-ins to a vendor data marketplace as well as by applications associated with a vendor applications marketplace. Although this particular embodiment utilizes a federation applications marketplace, other types of applications marketplaces can be used in other embodiments. Accordingly, any reference to federation applications marketplace 324 in the context of FIG. 5 and elsewhere herein is by way of example only, and should not be construed as limiting in any way.

The multi-tiered adaptive service catalog in this embodiment further comprises a tiered arrangement 326 that includes a lower tier ("1") comprising one or more service deployment frameworks, an intermediate tier ("2") comprising vertically-defined base applications, and an upper tier ("3") comprising ecosystem applications. The one or more service deployment frameworks in this embodiment are more particularly in the form of a vendor service catalog. Other types and arrangements of multi-tiered adaptive service catalogs and associated tiers may be used in other embodiments.

The ecosystem applications in the upper tier of the multi-tiered adaptive service catalog in this embodiment illustratively include a combination of applications designed internally to a given vendor organization, applications designed externally to the given vendor organization, and applications designed in partnership between the given vendor organization and one or more third-party partners.

The IoT blueprint library of the multi-tiered adaptive service catalog can be viewed as providing a business decision engine that determines a specific IoT blueprint instance to apply for a given customer use case.

For example, a given IoT blueprint instance enables the selection and implementation of the following:

1. A vendor service catalog of underlying infrastructure controls including products, services, solutions and processes.
2. A set of vertically-defined base applications which are specific to the use case being addressed which form the base of a marketplace of applications.
3. A set of ecosystem applications which are specific to the use case being addressed which form the ecosystem components of a marketplace of applications.

The decisions made in each of the three steps outlined above collectively create a unique IoT blueprint based on the particular customer use case being addressed. This IoT blueprint utilizes particular items from the vendor service catalog, vertically-defined base applications and ecosystem applications to deploy the IoT platform 310-1 in the particular customer use case. It should be noted that a given "customer" referred to herein is an example of what is more generally referred to as a user. Such a user can provide requirements input characterizing the particular use case via one or more of the user devices 302. As noted above, the term "user" is to be broadly construed herein, and may comprise organizations or other non-human entities including entities that are at least partially automated.

The IoT blueprint library in the present embodiment is itself accessible via the federation applications marketplace 324. An IoT blueprint library and its one or more associated applications marketplaces can each be either open or closed. For example, an applications marketplace that is configured as an open applications marketplace may be made accessible to certain third parties designated by a customer. If a given customer requires exclusive access to the applications of a given applications marketplace, the applications marketplace may be configured as a closed applications marketplace. Accordingly, the system 300 can include multiple instances of distinct applications marketplaces each accessible to different sets of users.

In some embodiments, a given application carries its own distinct profile. For example, the profile for the given application may indicate that the application has been built for a specific customer use case, but can be generalized for similar use cases applied within the same vertical and/or horizontal. Other applications can have profiles indicating that the applications are based on generally-accepted horizontal needs across industries. Still other applications can have profiles indicating that the applications are based on management of the infrastructure itself, and need to be deployed in various cases where that infrastructure is used.

These and other applications in illustrative embodiments may be part of an Adaptive Industrial Internet Applications ("AIIA") ecosystem. For example, the AIIA may be configured to enable the scaling of application creation and/or development, as well as deployment using templates of applications that allow them to be replicated vertically or horizontally and in myriad forms. This approach avoids the need for vendors, partners and customers to continuously purpose-design each individual application, and as a result IoT deployment costs and time to market are substantially reduced.

Figure 6:
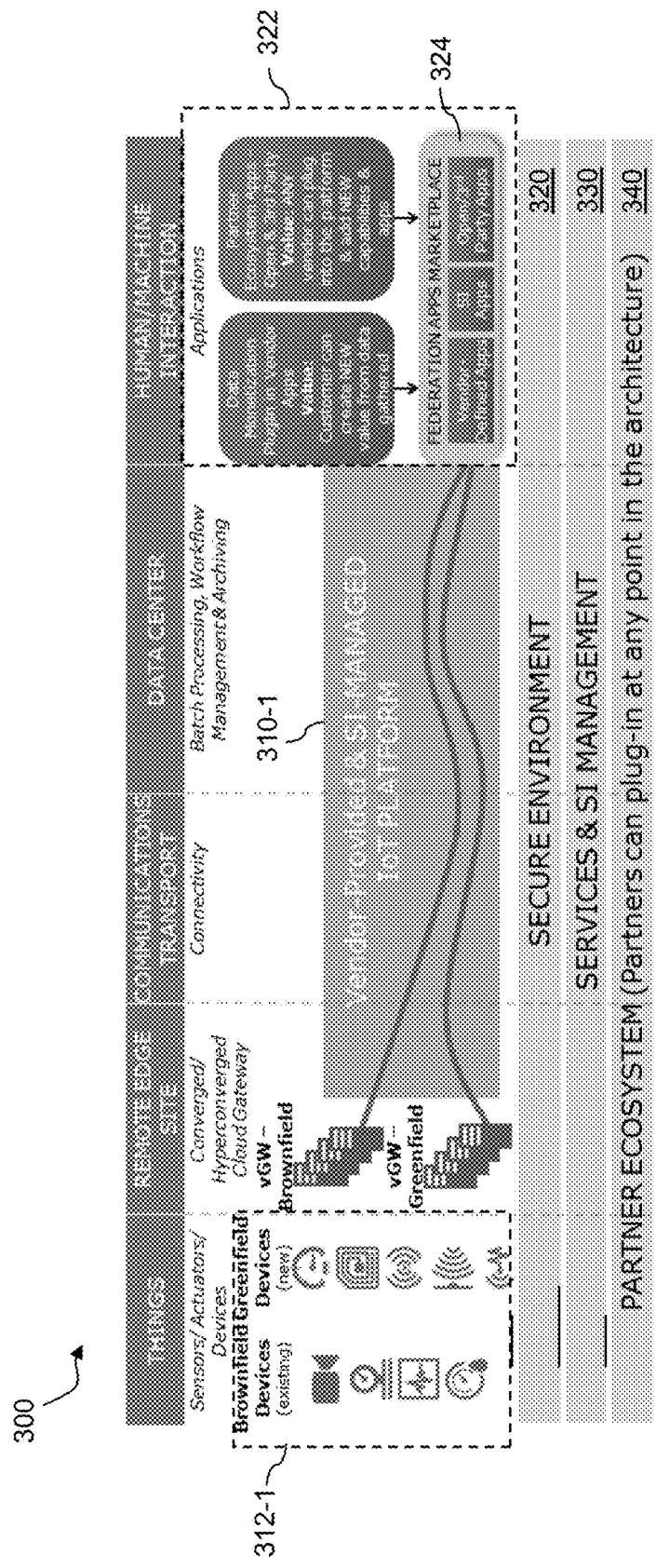

FIG. 6 shows a customer perspective view of the information processing system 300 comprising deployed IoT platform 310-1. In this embodiment, the IoT platform 310-1 is more particularly shown as a vendor-provided and SI-managed IoT platform. The IoT platform 310-1 utilizes secure environment 320 that spans the system architecture layers from the IoT devices 312-1 to the user devices 302. Again, the user devices 302 are not explicitly shown in this figure but are assumed to be present within system 300. The system 300 further comprises a services and SI management layer 330 that also spans the system architecture layers. Underlying the services and SI management layer 330 in this embodiment is a partner ecosystem layer 340 that illustratively allows partners to plug-in to the system architecture at any point in the architecture. The layers 330 and 340 may be part of an IoT management module of the system 300 and support interaction with multiple external system provider or SI partners each associated with one or more portions of the set of resources used to implement IoT platform 310-1.

An IoT management module comprising at least portions of the layers 330 and 340 in the FIG. 6 embodiment provides strategic partners with the capability to provide components for the IoT blueprint library and associated applications marketplaces. For example, multiple partnerships can be enabled simultaneously through the creation of numerous distinct applications marketplaces which are created for each service provider or system integrator. The IoT management module can be configured to assess the capabilities of each strategic partner, and to recommend specific applications based on existing customer needs, which are then mapped to partner capabilities, typically inside vertical markets.

In the FIG. 6 embodiment, the IoT devices 312-1 are shown as being separated into existing legacy or "brownfield" IoT devices and new or "greenfield" IoT devices. The remote edge site layer in this embodiment comprises converged and/or hyperconverged cloud gateways including first virtual gateways ("vGateways" of "vGWs") associated with the brownfield IoT devices and second virtual gateways associated with the greenfield IoT devices. The IoT platform 310-1 provides connectivity via the communications transport layer and batch processing, workflow management and archiving via the data center layer, for applications from the federation applications marketplace 324. These applications illustratively include separate applications for the brownfield and greenfield IoT devices. The IoT platform 310-1 facilitates the integration of the brownfield and greenfield devices into a single IoT solution for a given customer use case. For example, it ensures that the appropriate protocol support is deployed in the respective brownfield and greenfield virtual gateways.

In some embodiments, the users associated with a given customer for which the IoT platform 310-1 is deployed include both operations technology (OT) agents and information technology (IT) agents. The OT agents are generally concerned with the operation of the components of the IoT platform, such as is the gateway switched on, are packets flowing, is it fully optimized, etc. The IT agents are generally focused on leveraging the value provided by the IoT platform for particular business outcomes, such as monetization of the data, creation of new business models, cost efficiencies, etc. The IT agents are therefore most concerned with the human/machine interaction layer of the system architecture, including the IoT blueprint library and its associated applications marketplace, because this is where the data monetization value is realized. The OT agents are concerned with components across all layers of the system architecture, since all of the components need to operate efficiently for there to be any business outcome.

As is apparent from the foregoing, the system 300 as illustrated in FIGS. 3 through 6 advantageously allows a given customer or other user to design, develop and deploy a full end-to-end IoT solution comprising the IoT platform 310-1. This embodiment utilizes a multi-tiered adaptive service catalog comprising an IoT blueprint library to implement desired IoT functionality such as collection, ingestion, processing, filtering, tagging, analysis, feedback and output of data, as well as associated communication and action/control flows. Such an arrangement provides a new paradigm configured to meld OT and IT requirements in achieving the efficient and flexible deployment of IoT platforms.

As mentioned above, illustrative embodiments can be utilized to configure and deploy IoT platforms in a wide variety of different use cases and verticals. Examples of such use cases in the verticals of healthcare and agriculture will now be described.

In the healthcare vertical, one possible use case is a hospital IoT deployment involving primary, secondary and tertiary vendors. Assume that the primary vendor in this example is the vendor of the IoT blueprint library of an IoT platform configuration and deployment system. Such a primary vendor is also referred to herein as an IT infrastructure provider. A service provider or SP is the secondary vendor in this example. Delivery of the IoT platform takes place through a tertiary vendor such as a hospital management company that serves as a vertical-specific subject matter expert. The hospital is the end user for which the IoT platform is deployed and can offer up components of its IoT platform to members of its ecosystem such as insurers, billers, doctors, patients, etc.

The primary vendor in this example creates an IoT blueprint for the healthcare vertical based on its service catalog. The secondary vendor adapts the IoT blueprint to the particular use case needs of the tertiary vendor by making additions or other modifications appropriate to accommodate those needs. The tertiary vendor may make additional changes based on the particular needs of their immediate customer, which is the hospital in this example. Similarly, the hospital can make further changes. The result is a particular instance of an IoT blueprint that is particularly adapted to the requirements of the primary, secondary and tertiary vendors as well as the customer.

The tertiary vendor can identify the particular brownfield IoT devices already existing in the hospital environment that are to interact with the IoT platform, and can also recommend additional greenfield devices to be deployed within the hospital environment in conjunction with deployment of the IoT platform.

A number of vGateways will be deployed as part of the remote edge sites which in this example would be various physical locations associated with the hospital facility. From the software-defined gateways, IoT data is sent to vCPE elements which provide more robust store and forward, analytics and transmission capabilities than the vGateways themselves, thus allowing greater data sets to be collected, stored and/or analyzed on site, enabling real-time data analysis in order to satisfy specific time-sensitive IoT use cases.

From the remote edge site at the hospital, data is transmitted to a cloud and/or to a core data center. At this point, more in-depth Big Data analytics can be performed, for example, in relation to extrapolating historic and/or trend-based insights pulled from larger data sets.

Finally, the multi-tier adaptive IoT marketplace value is achieved utilizing applications specific to the use case of the hospital. These applications are available through the cloud and/or the core data center in order to serve the end customer which in this example is the hospital and the various members of its ecosystem.

Similar arrangements can be implemented for numerous other verticals and a wide variety of use cases within each such vertical. For example, as indicated previously, another vertical is agriculture. In one possible farming use case in the agriculture vertical, the primary vendor is again the IT infrastructure provider, but the secondary vendor is a systems integrator or SI, and the tertiary vendor is an agricultural equipment vendor. The end users are one or more farmers. Based on farmer needs, the tertiary vendor determines which equipment to deploy, and the specific configurations of sensors and bolt-on components necessary to satisfy the farmer use case. The vGateways and vCPE are deployed in a manner similar to that described above, except on one or more farms rather than in locations associated with a hospital facility. Also, communications transport and data center layers of the system architecture are configured in a manner similar to that described above for the hospital use case.

Each farm in the present example may correspond to a different remote edge site, and IoT platform solutions can be replicated across multiple distinct farms using the IoT blueprint library to support mass customization. The secondary vendor in this example interacts directly with the tertiary vendor to determine what is needed from an IT and OT perspective, and how to tune the specific configuration at any point in time prior to actual deployment. The secondary vendor works with the primary vendor to determine the IT infrastructure needs of the IoT solution. The tertiary vendor works with the end user famers at the edge site farms to determine the particular customized end user needs for the final configuration.

It is to be appreciated that the foregoing verticals and use cases are examples only, and that embodiments of the invention can be implemented in a wide variety of different IoT contexts, from small-sized IoT networks like smart homes to large IoT networks like factory automation and smart city arrangements.

As indicated elsewhere herein, illustrative embodiments can provide a number of significant advantages relative to conventional arrangements.

For example, illustrative embodiments allow IoT platforms to be configured and deployed in a particularly efficient manner that is readily scalable to increasingly larger numbers of IoT devices.

A given IoT platform deployed in this manner can potentially integrate a diverse array of applications and other resources from different vendors, partners, system providers and system integrators. Such arrangements facilitate satisfaction of customer needs while also reducing costs and improving performance.

Moreover, some embodiments allow combinations of legacy or "brownfield" IoT devices with new or "greenfield" IoT devices to be easily accommodated by a given one of the deployed IoT platforms.

In some embodiments, IoT platform configuration and deployment is highly dynamic and take into consideration information obtained from monitored IoT device behavior utilizing Big Data analytics.

The IoT blueprint approach in illustrative embodiments allows rapid vertical platform creation, the use of brownfield and greenfield devices, the creation, management and orchestration of software-defined gateways and CPE, support of streaming, real-time and batch analytics, cloud and core data center deployment, and rapid prototyping and deployment of applications, utilizing a broad ecosystem of partners.

Illustrative embodiments can broadly scale across numerous distinct industries or other verticals, as well as across numerous use cases associated with diverse customer needs within each such vertical.

It is to be appreciated that the foregoing advantages are illustrative of advantages provided in certain embodiments, and need not be present in other embodiments.

As mentioned previously, at least portions of the information processing system 100 may be implemented using one or more processing platforms. Illustrative embodiments of such platforms will now be described in greater detail in conjunction with FIGS. 7 and 8. Although described primarily in the context of information processing system 100, these platforms may also be used to implement at least portions of other information processing systems in other embodiments of the invention.

Figure 7:
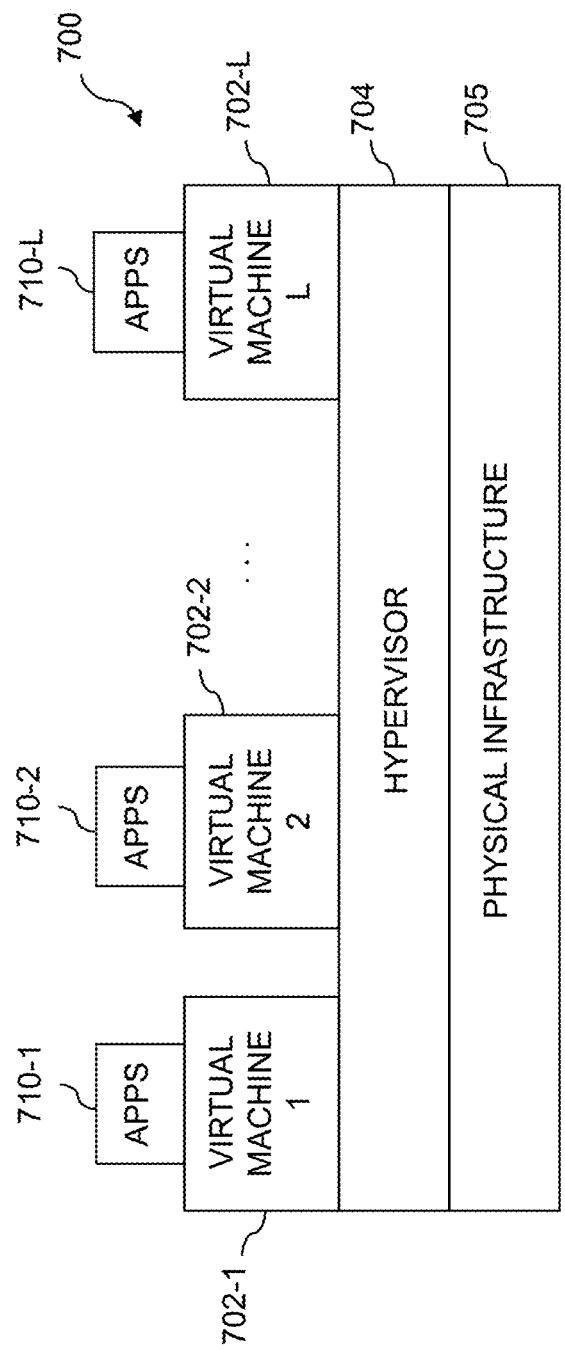
FIGS. 7 and 8 show examples of processing platforms that may be utilized to implement at least a portion of an information processing system in illustrative embodiments.
Figure 8:
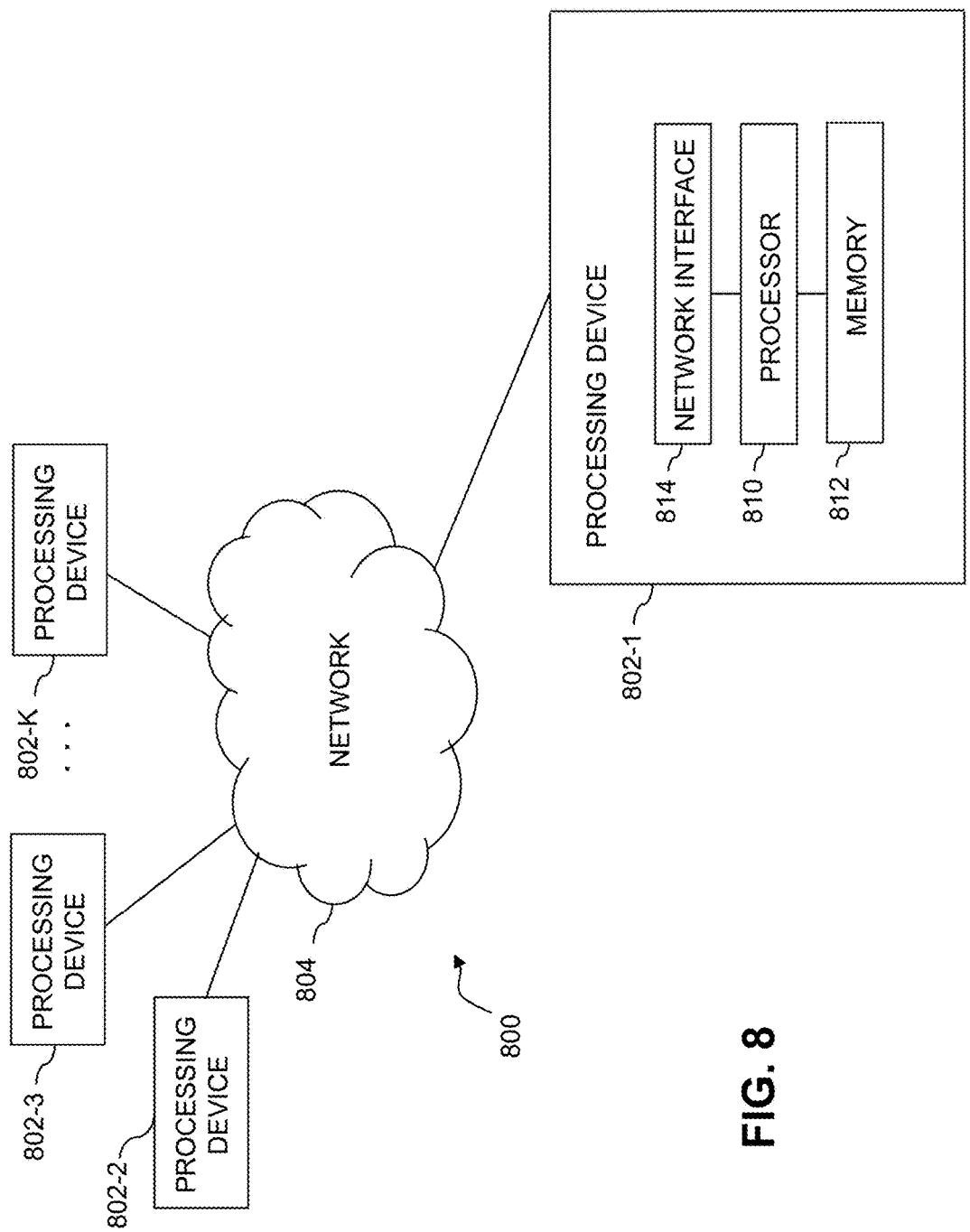

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises virtual machines (VMs) 702-1, 702-2, . . . 702-L implemented using a hypervisor 704. The hypervisor 704 runs on physical infrastructure 705. The cloud infrastructure 700 further comprises sets of applications 710-1, 710-2, . . . 710-L running on respective ones of the virtual machines 702-1, 702-2, . . . 702-L under the control of the hypervisor 704.

These and other types of cloud infrastructure can be used to implement one or more system components, such as IoT platform configuration and deployment system 105, deployed IoT platforms 110, or portions thereof, in a given embodiment.

Although only a single hypervisor 704 is shown in the embodiment of FIG. 7, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 704 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage system in an illustrative embodiment.

More specifically, some embodiments can comprise a storage system implemented using DAS configurations comprising local hard drives in respective servers. Such a storage system may additionally or alternatively comprise specialized high-performance flash storage such as DSSD™ accessible via PCIe connections. Numerous other configurations are possible for a given storage system or other related components of the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing PCIe cards of those devices, and networking protocols such as InfiniBand, Gigabit Ethernet or Fibre Channel.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the system 100, although in other embodiments a given tenant can have multiple containers. The containers may be utilized to implement a variety of different types of functionality within the system 100. For example, containers can be used to implement respective cloud compute nodes or cloud storage nodes of a cloud computing and storage system. The compute nodes or storage nodes may be associated with respective cloud tenants of a multi-tenant environment of system 100. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, an EMC Federation Company. For example, portions of an IoT platform configuration and deployment system of the type disclosed herein can be implemented utilizing converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of a configuration and deployment controller, a multi-tiered adaptive service catalog or other component of an IoT platform configuration and deployment system are illustratively implemented in one or more embodiments the form of software running on a processing platform comprising one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, IoT platform configuration and deployment systems, IoT platforms, IoT devices and other components. Also, the particular configurations of system and device elements, associated processing operations and other IoT platform configuration and deployment functionality illustrated in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
an Internet of Things (IoT) platform configuration and deployment system accessible to a plurality of user devices over at least one network;
wherein the IoT platform configuration and deployment system comprises:
a configuration and deployment controller; and
a multi-tiered adaptive service catalog associated with the controller;
wherein the configuration and deployment controller is configured to receive requirements input for respective ones of a plurality of requested IoT platforms from one or more of the user devices and to determine corresponding sets of resources for implementation of the respective IoT platforms based at least in part on one or more services selected from the multi-tiered adaptive service catalog;
wherein the multi-tiered adaptive service catalog comprises:
a lower tier comprising one or more service deployment frameworks; and
a plurality of higher tiers each comprising a plurality of applications of a particular type, with each of the higher tiers comprising applications of a different type than any other such higher tier;
wherein the IoT platforms are deployed utilizing the respective sets of resources determined by the configuration and deployment controller;
wherein each of the deployed IoT platforms is configured to interact with a different set of IoT devices; and
wherein the IoT platform configuration and deployment system is implemented by one or more processing devices each comprising a processor coupled to a memory.

2. The apparatus of claim 1 wherein the set of resources determined by the configuration and deployment controller for a given one of the IoT platforms comprises remote edge site resources, communications transport resources and data center resources.

3. The apparatus of claim 2 wherein the remote edge site resources comprise at least one software-defined gateway and at least one software-defined customer premises equipment element.

4. The apparatus of claim 2 wherein the communications transport resources comprise a combination of wireless resources and wireline resources.

5. The apparatus of claim 2 wherein the communications transport resources comprise at least one transport cloud.

6. The apparatus of claim 2 wherein the communications transport resources comprise at least one public, private or hybrid cloud.

7. The apparatus of claim 2 wherein the data center resources comprise processor, network and storage resources.

8. The apparatus of claim 7 wherein the data center resources further comprise a plurality of applications at least a subset of which are associated with at least one service of the multi-tiered adaptive service catalog.

9. The apparatus of claim 1 wherein the multi-tiered adaptive service catalog comprises an IoT blueprint library and at least a subset of the IoT platforms are implemented in accordance with respective distinct instances of the IoT blueprint library.

10. The apparatus of claim 1 wherein the higher tiers of the multi-tiered adaptive service catalog comprise:
an intermediate tier comprising vertically-defined base applications; and
an upper tier comprising ecosystem applications.

11. The apparatus of claim 10 wherein the ecosystem applications include applications designed internally to a given vendor organization, applications designed externally to the given vendor organization, and applications designed in partnership between the given vendor organization and one or more third-party partners.

12. The apparatus of claim 1 wherein the configuration and deployment controller further comprises an IoT management module that spans the sets of resources utilized to implement respective ones of the IoT platforms.

13. The apparatus of claim 12 wherein the IoT management module supports interaction with multiple external system provider or system integrator partners each associated with one or more portions of the sets of resources.

14. An apparatus comprising:
an Internet of Things (IoT) platform configuration and deployment system accessible to a plurality of user devices over at least one network;
wherein the IoT platform configuration and deployment system comprises:
a configuration and deployment controller; and
a multi-tiered adaptive service catalog associated with the controller;
wherein the configuration and deployment controller is configured to receive requirements input for respective ones of a plurality of requested IoT platforms from one or more of the user devices and to determine corresponding sets of resources for implementation of the respective IoT platforms based at least in part on one or more services selected from the multi-tiered adaptive service catalog;
wherein the configuration and deployment controller implements an applications marketplace comprising vendor-defined applications, system integrator applications and third-party applications utilizable within a given one of the sets of resources for implementing a corresponding one of the IoT platforms;
wherein the IoT platforms are deployed utilizing the respective sets of resources determined by the configuration and deployment controller;
wherein each of the deployed IoT platforms is configured to interact with a different set of IoT devices; and
wherein the IoT platform configuration and deployment system is implemented by one or more processing devices each comprising a processor coupled to a memory.

15. A method comprising:
receiving requirements input for respective ones of a plurality of requested IoT platforms from one or more user devices over at least one network;
determining corresponding sets of resources for implementation of the respective IoT platforms based at least in part on one or more services selected from a multi-tiered adaptive service catalog; and
controlling deployment of the IoT platforms utilizing the respective sets of resources;
wherein the multi-tiered adaptive service catalog comprises:
a lower tier comprising one or more service deployment frameworks; and
a plurality of higher tiers each comprising a plurality of applications of a particular type, with each of the higher tiers comprising applications of a different type than any other such higher tier;
wherein each of the deployed IoT platforms is configured to interact with a different set of IoT devices; and
wherein the receiving, determining and controlling steps are implemented by one or more processing devices each comprising a processor coupled to a memory.

16. The method of claim 15 wherein the set of resources determined for a given one of the IoT platforms comprises remote edge site resources, communications transport resources and data center resources.

17. The method of claim 15 wherein the multi-tiered adaptive service catalog comprises an IoT blueprint library and at least a subset of the IoT platforms are implemented in accordance with respective distinct instances of the IoT blueprint library.

18. A computer program product comprising a non-transitory processor-readable storage medium having stored therein program code of one or more software programs, wherein the program code when executed by at least one processing device causes said at least one processing device:
to receive requirements input for respective ones of a plurality of requested IoT platforms from one or more user devices over at least one network;
to determine corresponding sets of resources for implementation of the respective IoT platforms based at least in part on one or more services selected from a multi-tiered adaptive service catalog; and
to control deployment of the IoT platforms utilizing the respective sets of resources;
wherein the multi-tiered adaptive service catalog comprises:
a lower tier comprising one or more service deployment frameworks; and
a plurality of higher tiers each comprising a plurality of applications of a particular type, with each of the higher tiers comprising applications of a different type than any other such higher tier;
wherein each of the deployed IoT platforms is configured to interact with a different set of IoT devices.

19. The computer program product of claim 18 wherein the set of resources determined for a given one of the IoT platforms comprises remote edge site resources, communications transport resources and data center resources.

20. The computer program product of claim 18 wherein the multi-tiered adaptive service catalog comprises an IoT blueprint library and at least a subset of the IoT platforms are implemented in accordance with respective distinct instances of the IoT blueprint library.

\* \* \* \* \*